United States Patent [19]
Leis et al.

[11] Patent Number: 5,036,408
[45] Date of Patent: Jul. 30, 1991

[54] HIGH EFFICIENCY DISK FORMAT AND SYNCHRONIZATION SYSTEM

[75] Inventors: Michael D. Leis, Framingham; Bruce Leshay, Marlborough; Michael Muchnik, Framingham; Satish Rege, Groton, all of Mass.; Charles M. Riggle, Colorado Springs, Colo.; Lih-Jyh Weng, Lexington, Mass.

[73] Assignee: Digital Equipment Corporation, Maynard, Mass.

[21] Appl. No.: 193,090

[22] Filed: May 12, 1988

[51] Int. Cl.⁵ .................................................. G11B 5/09
[52] U.S. Cl. ........................................................ 360/48
[58] Field of Search ......................... 360/48, 40, 77.05

[56] References Cited

U.S. PATENT DOCUMENTS

| | | | |
|---|---|---|---|
| 3,534,344 | 10/1970 | Santana | 360/77.05 |
| 3,893,180 | 7/1975 | Braun | 360/77.05 |
| 4,622,602 | 11/1986 | Kutaragi | 360/48 |

Primary Examiner—Vincent P. Canney
Attorney, Agent, or Firm—Nutter, McClennen & Fish

[57] ABSTRACT

A disk drive system provides all required synchronization, positioning, validation, and data functions within each disk sector. All of these functions are provided within two zones, a header section and a data section. The header section includes a preamble, a synchronization character and an address field, as well as servo information for track following. The data section of each sector includes a data preamble, a data synchronization character, a bad sector bit map, the data and data redundancy information. The header section of at least one sector in a track includes a short DC-erase field, a transitionless segment which is used in synchronization. To synchronize a read/write head to the disk, the system first detects the DC-erase field. The system next searches for the header preamble and synchronization character. If it finds them within predetermined times, it then looks for a valid sector address to complete the synchronization. If the system does not detect the preamble and synchronization character within the predetermined times, it looks for another DC-erase field and continues the synchronization process. After the preamble and synchronization character are found, the desired sector is located by reading the addresses of the succeeding sectors.

31 Claims, 10 Drawing Sheets

LOOKING FOR DC-ERASE FIELD

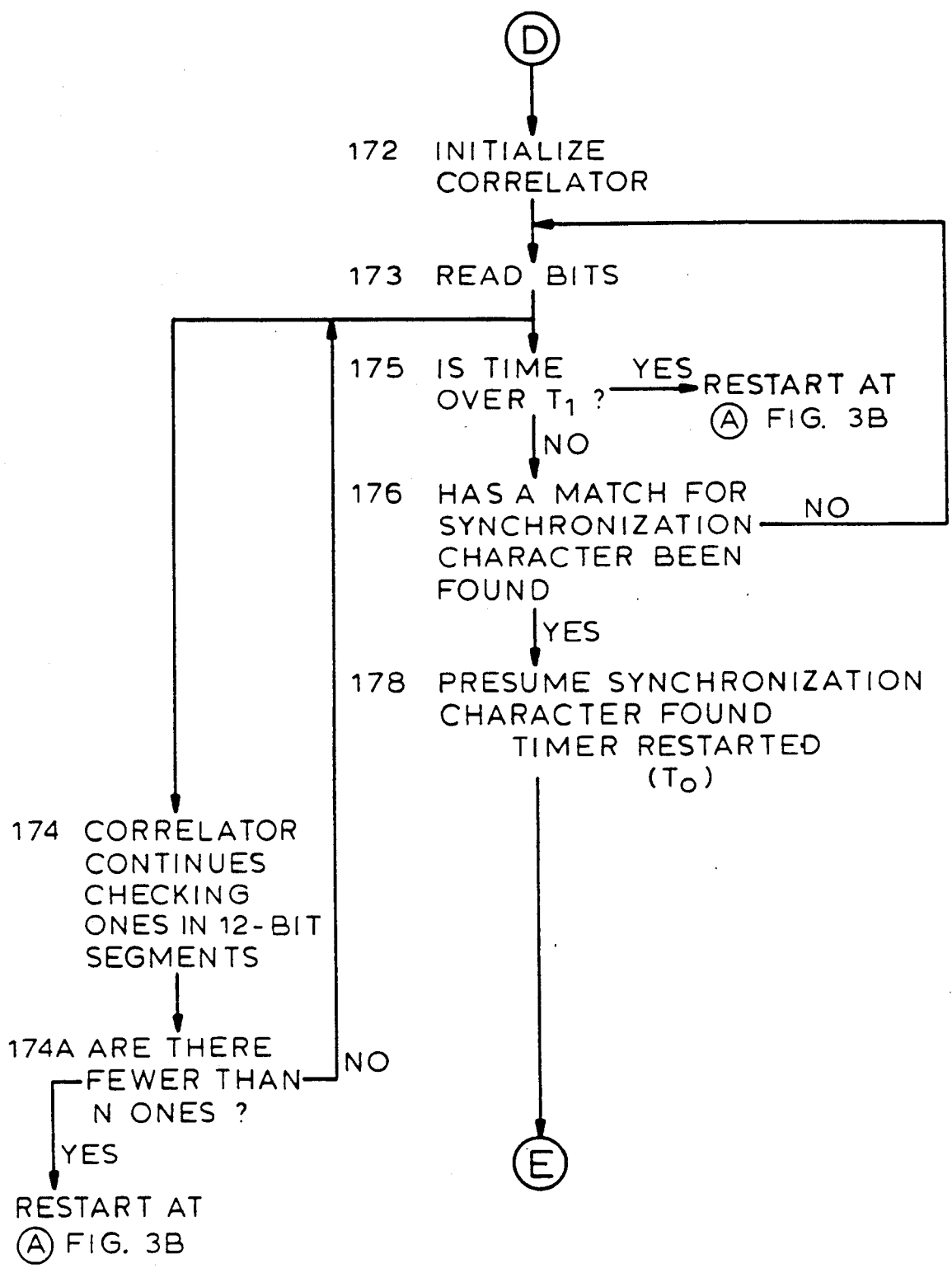

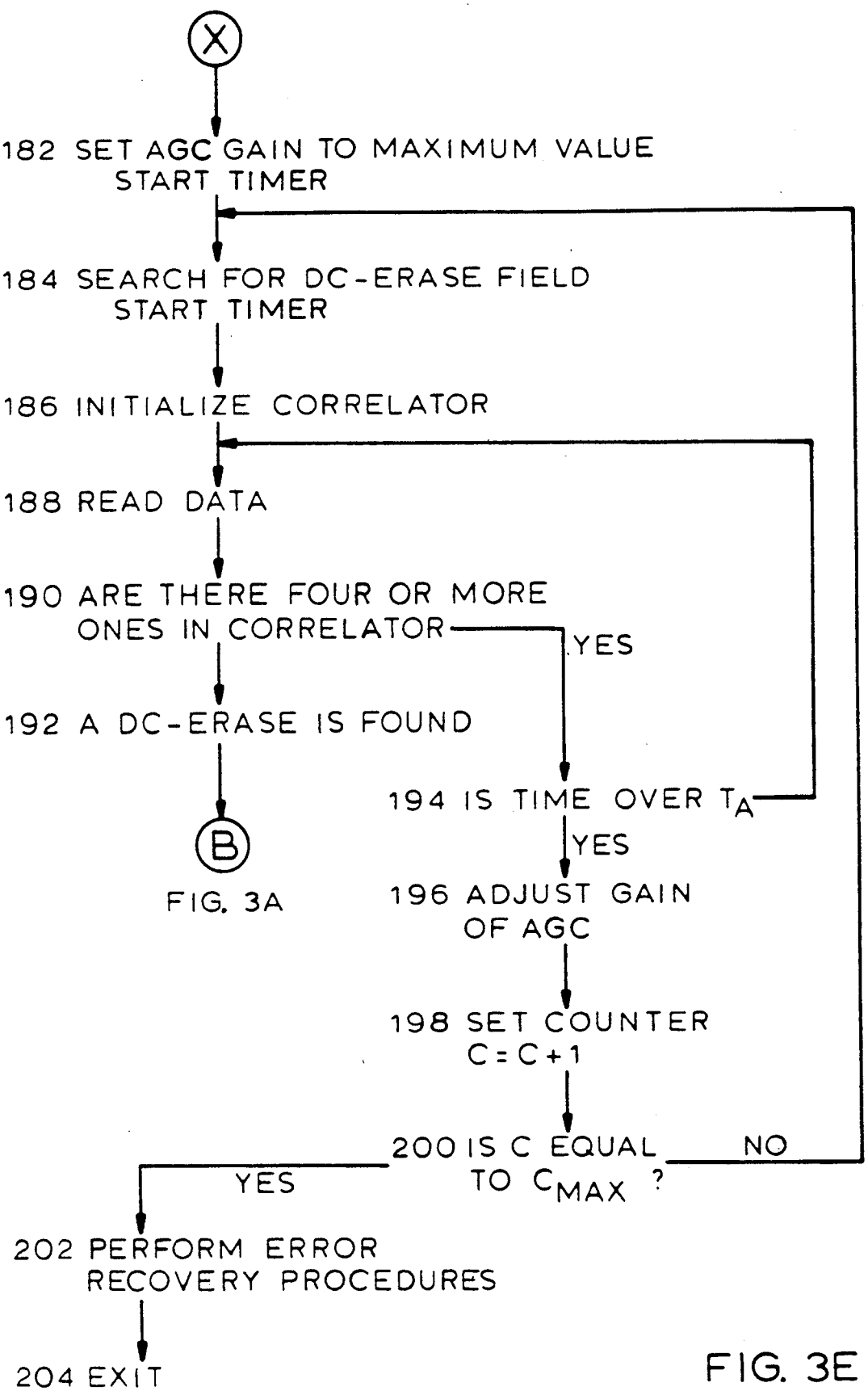

HIGH EFFICIENCY DISK FORMAT AND SYNCHRONIZATION SYSTEM

FIELD OF INVENTION

The invention relates generally to magnetic disk sector formatting and data synchronization.

BACKGROUND OF THE INVENTION

Digital data processing systems typically include data storage devices, for example, multi-disk disk drives. Data is recorded on the disks in concentric tracks. The tracks are divided into sectors, and each sector is further divided into a header section and a data section. Data is recorded in (written) or retrieved from (read) the data portions of the sectors while address information, that is, disk surface number, track number and sector number, is stored in the header sections.

Data is read from or written to the disks using read/write heads. Each head is associated with a particular disk surface or portion of a disk surface. As the disks rotate under the heads, data is, for example, read from a particular sector when the associated head is over the data portion of that sector.

To begin a read or write operation the appropriate head is moved to the track containing the desired sector. Unless the head was used in the preceding read or write operation, or it has been kept in synchronization by appropriate timers, for example during idle times, the head must then be synchronized to the disk so that the sector addresses rotating under it can be read. Once the head is synchronized, it locates the selected sector by reading the sector addresses and then it performs the read or write operation. Head switching, which may involve switching between heads on a common actuator arm or switching between heads on different arms, occurs quite often during the normal operation of the disk drive and thus synchronization is performed often also. The speed with which the heads are accurately synchronized to the disks affects the speed with which data can be transferred to or from the drive.

Using prior technology, timing information for synchronizing is recorded either on an extra servo surface or as an additional information zone between sectors, referred to as an embedded-servo zone. If the disk drive is one which uses fixed block architecture and data surface only embedded-servo information, certain information must be contained within the space of each sector and related servo zone to enable the system to operate in real time, that is, to perform certain functions within the time it takes for the sector to rotate under the head. For example, sector timing must be established, and bit, data symbol and data word synchronization must be determined using the recorded servo and synchronization information. Also, if alternate sectors can be used to replace corrupted, or bad, sectors flags indicating which sectors are good and which are bad must be read and interpreted. Additionally, each sector contains data that must be read and validated, and if necessary corrected, using recorded data redundancy symbols. It is desirable to perform all of these functions with minimum disk overhead, that is, with minimum consumption of extra recording space, leaving the disk space free for data.

Prior technology embedded-servo disk drives typically use three-zone formats. The three zones are a servo zone, containing servo position information which is permanently written at the factory when the disks are formatted, and two sector zones, a header zone containing address and bad sector information which can be re-written during re-formatting to indicate which sectors have degraded from good to bad, and a data zone containing data and data redundancy symbols which can be easily written and re-written by the user.

Using three zones requires the disk drive to synchronize three times, once per zone, in order to perform a read or write operation in a sector. Thus each zone must contain synchronization and timing information. This causes increased overhead, resulting in a loss of recording efficiency. Thus it is desirable to reduce the number of zones while retaining all the functionality of the three-zone architecture. Also, as users demand disk drives with more and more data storage capacity, it is more and more desirable to use less disk space for synchronization.

Prior technology also requires significant dedicated timing hardware, for example, timing logic or analog electronics is required to interpret the recorded timing information and synchronize the heads. The servo-zone typically contains a long synchronization burst written in a frequency which is unlikely to occur in the data, servo information for track following, and several information bits for track identification. Thus the embedded servo system must use analog filters to locate the synchronization burst and special timing and control logic to find the servo information, as well as to synchronize the head to the servo zone. This additional hardware increases the cost of the system. Thus it is desirable to perform synchronization using much of the same hardware as the normal read and write operations, and in particular using mostly digital logic. It is also desirable to perform synchronization quickly, even if the heads are not in a known position with respect to the servo information that would be used to align the data head on the track.

SUMMARY OF THE INVENTION

The invention is a disk drive system which provides all the required functions within each sector including: track error positioning information, sector bit, data symbol and data word synchronization, cylinder, track and sector addresses and address validation, good/bad sector flags, and data and data redundancy. All of these functions are provided within two zones to provide high data efficiency, that is, low overhead per sector. The inventive system synchronizes a controller state machine to the real time relation between the head and the disk by using hardware which is also used in read/write operations, thus reducing the required hardware.

Basically each sector is formatted with a header and a data section. The header section includes a preamble, a synchronization character and an address field, as well as servo information for track following. The data section of each sector includes a data preamble, a data synchronization character, a bad sector bit map, and the data and data redundancy information. The header section of at least one sector in a track includes a short DC-erase field, that is, a transitionless segment.

The inventive system first looks for a DC-erase field, using system hardware that normally is used in the read/write operations. Once it detects a DC-erase field it looks for the header preamble and synchronization character. If each of these are detected within predetermined times, a timer is set which allows the system to time to the address field and then to the servo information contained in the header. If the address field contains a valid sector address, the system assumes it is synchronized and the servo information is then used to center the head on the track. Thereafter, the desired sector is located by reading the addresses of the succeeding sectors. If any of the header sub-sections following the DC-erase field are not detected correctly within the predetermined times, the system looks for another DC-erase field and then continues the synchronization process. In this way the system is able to find the beginning of a sector and to synchronize using only the short DC-erase field and other header information.

The bad sector bit map is used to identify all bad sectors within a track or a section of a track. The bit map is redundant and located within each data zone within the track or section of the track to which it pertains. Thus the loss of one or more sectors is not likely to cause loss of knowledge about which sectors are bad.

DESCRIPTION OF THE DRAWINGS

The invention will be pointed out with particularity in the appended claims. The above and other advantages of the invention may be better understood by referring to the following description taken in conjunction with the accompanying drawings, in which:

FIG. 3D is a further flow chart, illustrating the steps used in looking for the synchronization character;

FIG. 3E is a flow chart of the steps used for setting the gain of the data channel;

DETAILED DESCRIPTION

Figure 1:
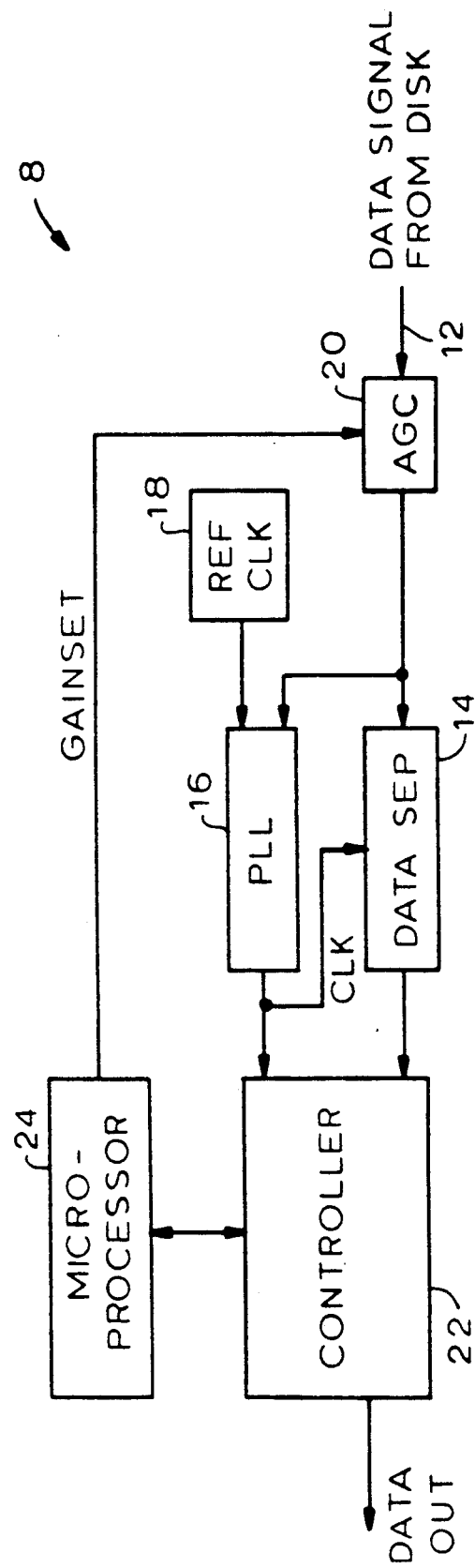
FIG. 1 is a functional block diagram of a system built in accordance with the invention.

With reference to FIG. 1, a system 8 is shown which may be used for synchronization and reading or writing data to or from magnetic disks (not shown). Data is, for example, read from a disk by read/write heads (not shown) and sent over line 12 to a read channel consisting of an automatic gain control (AGC) 20, a data separator 14 which "converts" peaks in the signal read from the disk to data, and a phase-locked loop (PLL) 16. During a read operation the AGC 20 sets the gain of the data channel such that the system 8 can distinguish data signals from noise. The data signals typically consist of relative positive and negative peaks within a predetermined amplitude range while noise signals typically consist of peaks below that range. Thus the gain of the AGC 20 is set either by feed-back from the signal or a setting from an external source, such as microprocessor 24, to a value which will amplify the data signal enough to "read" it but which will not amplify the noise signal to bring its peaks, which fall below the data signal range, within that range. If the AGC 20 gain is too large, noise peaks may be misinterpreted as data.

The PLL 16 sets the timing of signal sampling, that is, the times at which the analog signal from the read/write heads is sampled by the data separator 14. These samples are then turned into digital symbols representing the data written to the disk. The digital symbols are thereafter demodulated to binary data bits in a demodulator (not shown). The drive also contains a write channel (not shown) for writing data to the disk.

When data is to be read or written to a disk the system 8, using a controller 22 and a microprocessor 24, selects the head (i.e., the disk surface) associated with the sector involved in the operation and moves the head to the track containing the sector. If the selected head is not the head used in the preceding read or write operation on this disk surface, that is, if a head switch occurs, the timer and the clocks associated with the controller state machine operation must be re-synchronized to the recorded data on the disk. This is often referred to as synchronizing the head.

The head is synchronized by first finding the beginning of a sector and using the sector header information to set both the gain of the AGC 20 and the phase of the PLL 16 to values appropriate for the system 8 to read and interpret the header information. The sector to be read or written is then located by reading the addresses recorded in consecutive sectors on the track. Once the appropriate sector is found, the read or write operation is performed in the data section of that sector.

Figure 2:
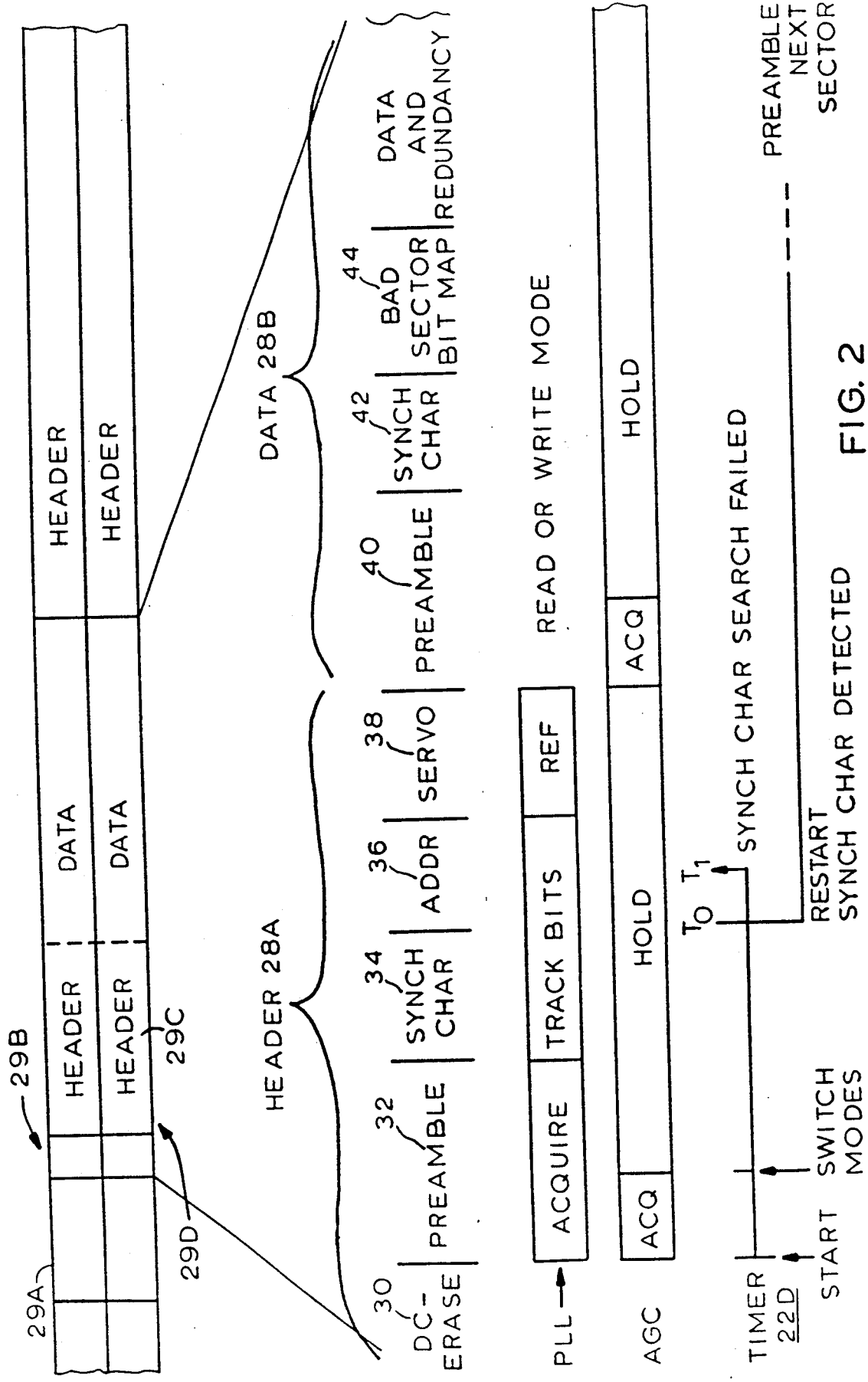
FIG. 2 illustrates the format of a disk recorded for use with the invention.

With reference to FIG. 2, a disk 28 is recorded with a radial contiguous format, that is, with portions of the header section of each sector recorded such that the start of each bit in these portions is radially contiguous with the corresponding bits in the adjacent tracks. For example, the bits in the preamble of header section 29B in track 29A are radially contiguous with the corresponding bits in the preamble of header section 29C in track 29D. In the preferred embodiment the sector addresses are Gray coded and thus there is only a one-bit difference between the addresses of contiguous sectors on adjacent tracks.

At least one sector, and preferably several or all sectors on a track, are formatted with a header section that includes a DC-erase field 30 at the beginning of the sector, followed by a preamble 32, a synchronization character 34, an address field 36 and a servo field 38. The DC-erase field 30 is a field without any magnetic transitions, that is, a signal recorded on the disk without magnetic flux reversals. It has a length in the preferred embodiment corresponding to the length of between three and eight bytes of recorded data.

The preamble 32 is a pattern of ONES and ZEROS containing a predetermined number of ONES, preferably the maximum number of ONES, that is, flux reversals, for a given number of recorded bits. The data recorded on the disk are typically encoded to aid in the demodulation of the signal when it is later read from the disk. Thus the code may prohibit ONES in consecutive bit locations. In the preferred embodiment the preamble 32 is the pattern 1010...101. The preamble 32 is used to set the gain of AGC 20 and to lock the phase of the PLL 16 to the bit frequency and phase of the header.

The synchronization character 34 is a pattern of ONES and ZEROS which allows the controller 22 to determine the boundary of the decode group, that is, the number of bit cells on the disk used for recording a given number of binary data bits, and for locating the start of the byte boundaries. For example, some codes encode two data-bits into three bits for recording, again to aid in the demodulation of the read-back signal, and thus the start of each three-bit decode group must be determined. The synchronization character 34 also allows the controller 22 to determine the boundaries of bytes of information recorded in the sector. At the end of the synchronization character a timer 22A (FIG. 4) is started which is used to time to the remaining header fields and to the next sector header.

The synchronization character used in the preferred embodiment is, s=1010100010001010001010010101001001. The system, using a clock from the PLL 16 which is one-half the bit frequency, as described in co-pending application entitled A Method of Handling Data From a Storage Device, filed May 12, 1988 and identified by Nutter, McClennen & Fish file number 15311-0281 which has a common assignee and is incorporated herein by reference, examines only every other bit. Thus the portion of the synchronization character which is actually used to synchronize is s'=1110101101100010, the under-lined portions of s. The bits which are interspersed with s' substantially eliminate inter-bit interference caused by, for example, the magnetic flux reversals representing two ONES interacting with each other. Such interference may cause peak shifts, resulting in the PLL 16 taking longer to lock to the correct bit-tracking phase or increased error in data seperating this pattern.

Alternatively, the preamble 32 can be used to determine the decode group. If, for example, the preamble is a pattern 100100 . . . 1 it can be used to determine the boundary of the three-bit decode group. The synchronization character 34 would then be used to determine the byte boundaries.

Following the synchronization character 34 are the address field 36 and the servo field 38. The address field 36 contains at least one copy of the sector address, in the preferred embodiment it contains four copies. The servo field 38 contains information which is used by the system 8 to center the head on the track.

The data section contains a data preamble 40 and a data synchronization character 42 which are identical with the preamble 32 and synchronization character 34 in the header. Following the data synchronization character is a bad sector bit-map which contains information about the good and bad sectors in the track, or a portions of the track. The bit-map is redundant in that it is recorded in multiple sectors in the track. The bit-maps can be re-written and thus up-dated, that is, as sectors degrade from good to bad the maps can be revised to reflect the degradation. Recording the map in multiple sectors serves to protect the map from loss due to the degradation of any one sector or group of sectors. The bit-map is followed by the data and data redundancy symbols.

The radial contiguous formatting of the disk 28 allows the preamble 32 and the synchronization character 34 to be located, regardless of where the associated head is placed with respect to the tracks. Without radial contiguous formatting, if, for example, the head straddles two tracks, the data signal in one track may be read as canceling the data signal in the other track, that is, a segment in which negative peaks in one track correspond to positive peaks in the other track may be read as a transitionless signal. Thus a DC-erase may be detected in the data section of the sector. If the acquire mode of the AGC 20 is then enabled, that is, during the detection of a false DC-erase, the acquired gain may cause the read channel to saturate and the system would not recover in time to "see" the real data. However, by recording the preambles 32, the synchronization characters 34 and the address fields 36 in a radial contiguous format bit canceling due to an off-center head is eliminated, and thus, each of these fields can be located once a true DC-erase is detected. Gray coding the addresses, also, allows the address to be determined to within two tracks, even if the head is straddling two tracks.

Figure 3A:
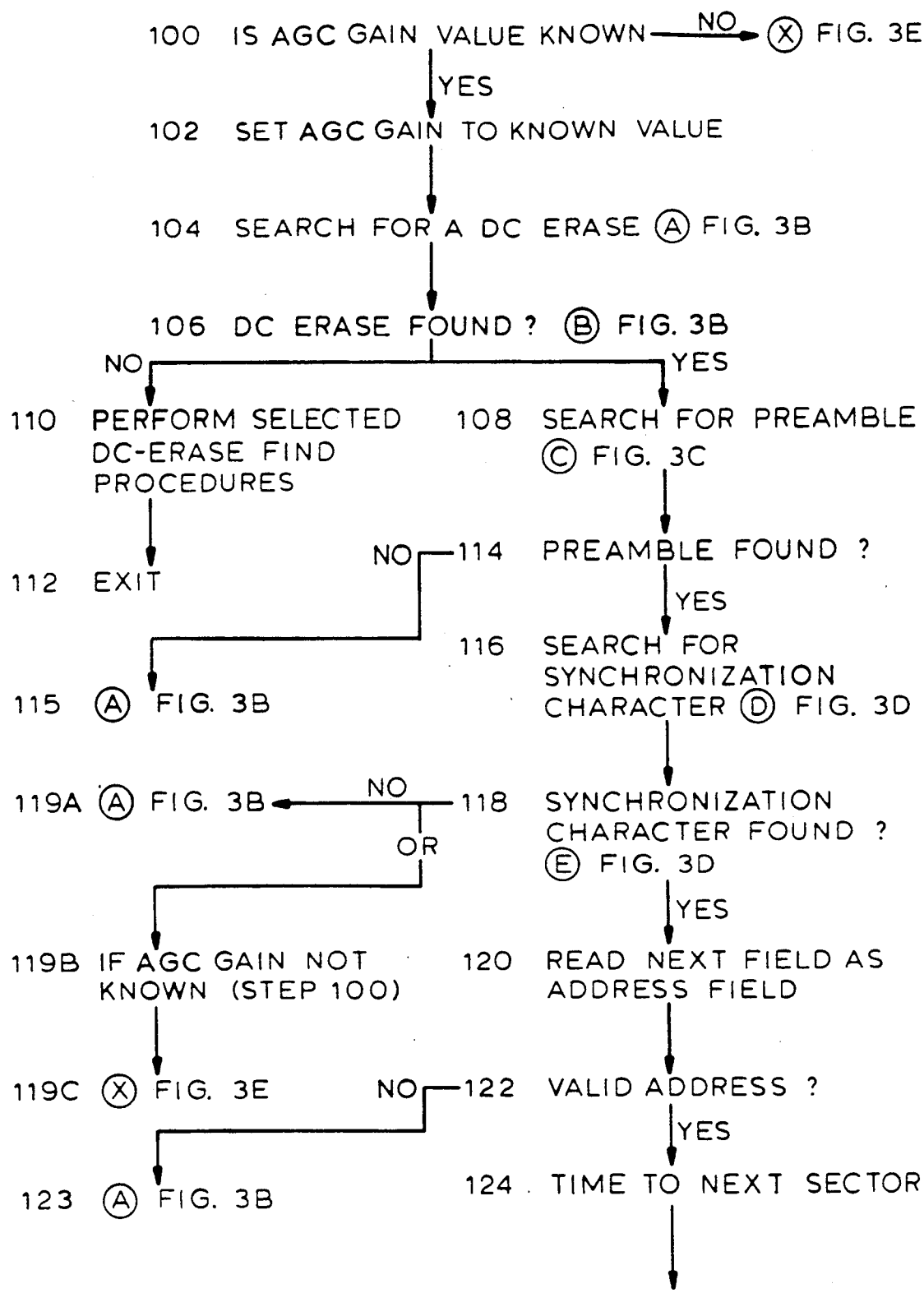
FIG. 3A is a flow chart of the operations of a system built in accordance with the invention, including the steps of looking for a DC-erase field, looking for a preamble, looking for a synchronization character and setting the data channel gain.
Figure 3A:
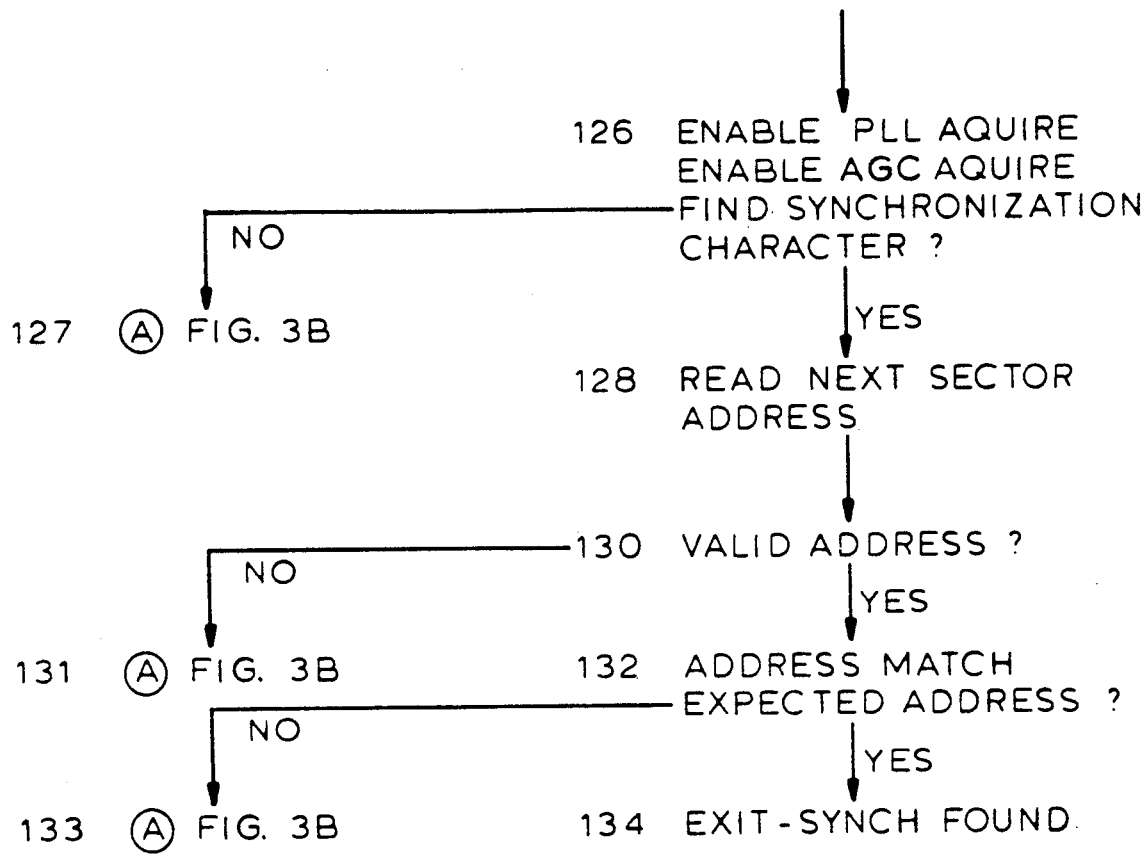

With reference to FIG. 3A, the system 8 operates in one of two modes during synchronization. If the system has not previously synchronized to the track, the appropriate gain of the read channel for data retrieval from the track is not known. Accordingly, the system first determines the approximate gain (FIG. 3E) before it begins the synchronization process at step 100. However, if the system has previously synchronized to the selected track, the approximate gain for that track has already been determined and stored in an appropriate memory (not shown). The system 8 retrieves that value and adjusts the gain of the AGC 20 to this fixed value. It then begins synchronization (step 102).

The synchronization process begins with a search for a DC-erase field 30 (step 104). The search operation is discussed in more detail with reference to FIG. 3B below.

With further reference to FIG. 3A, when a transitionless signal segment is detected, it is assumed that it is a DC-erase field (step 106). Thus the start of a sector is assumed found and a "search" for the preamble is started (step 108). It is likely that false DC-erase fields will be frequently found due to an off-center head $\propto$ s "canceling" of data signals. However, if the start of a sector has in fact been detected, the preamble will be detected within a predetermined time thereafter. The preamble will be detected regardless of whether or not the head is centered on the track due to the radially contiguous format of the disk.

If the DC-erase detected is not the start of a sector, the preamble will not be detected within the predetermined time and the search for the DC-erase field is begun again (steps 114–115). The preamble search is described in more detail with reference to FIG. 3C below. DC-erase fields are continuously searched for during the reamble search. If another DC-erase field is detected at any time during the preamble search, the search is re-started (step 166, FIG. 3C).

Figure 4:
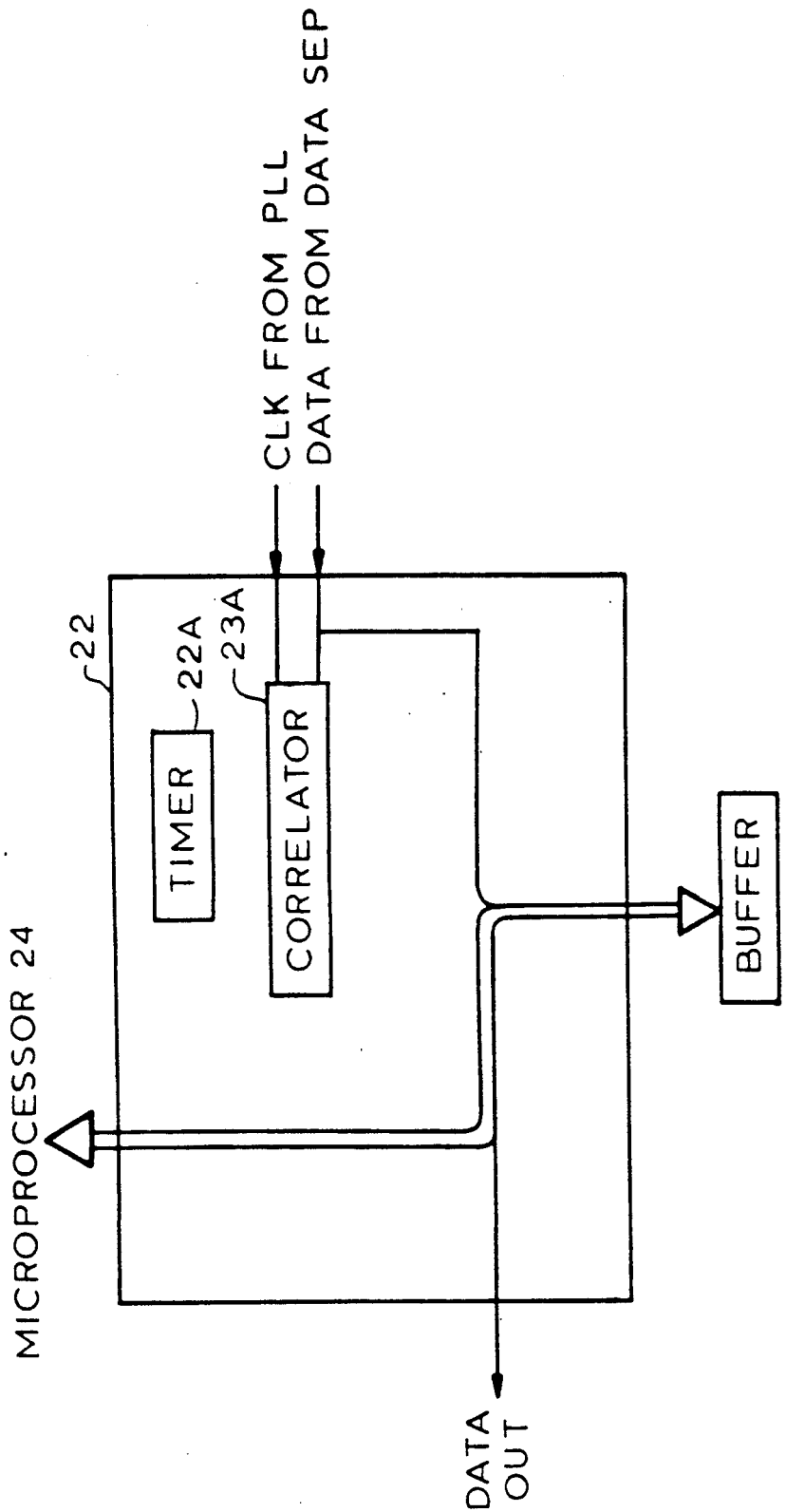
FIG. 4 is a functional block diagram of a controller shown in FIG. 1.

Again referring to FIG. 3A, once the preamble is detected, a search for the synchronization character is begun (step 116). The synchronization character will be found within a predetermined time if the previously detected DC-erase field and preamble denote the start of a sector. Sensing of the synchronization character allows the controller 22 to set a sector timer 22A (FIG. 4). The timer 22A is then used to enable controller operations on specific sector segments, for example, the end of the address field and then the start of the servo field, and also to the header section of the next sector. If the synchronization character is not sensed within the specified time, an indication of false detection of the DC-erase field and the preamble, the DC-erase field search is again started (step 119A). The synchronization character search is described in more detail with reference to FIG. 3D below. The DC-erase field search also continues throughout the synchronization character search. If a DC-erase is found at any time, the synchronization process is re-started (step 174A, FIG. 3D).

With further reference to FIG. 3A, when the synchronization character is sensed in the specified time interval, the next bits read from the sector are interpreted as the sector address field (step 120). The validity of the address retrieved from this field is then checked (step 122). In the preferred embodiment the address field contains a number of copies of the address, for example, four copies, and if some minimum number of copies match each other, for example two copies, the address is deemed valid.

If the address is valid, the controller 22 (FIG. 4) uses the sector timer 22A to time and enable the sampling of the servo field 38 and this sampling may then be used to move the head to the center of the track. It then uses the timer 22A to time to the next sector where it expects to find the sector header and enables the acquire modes of both the PLL 16 and AGC 20 in the preamble to synchronize to this next sector. It then reads the sector address field (steps 124–128) and determines the validity of this address by comparing a minimum number of copies to the expected sector address (step 130). Thus if, for example, the first sector found is sector 10 the next sector should be sector 11. If the sector address matches the expected address the head is assumed to be synchronized. If the address is an invalid address or it does not match the expected address, the system times to the next sector and reads that address to determine which sector is then rotating under the head. If the location of the head cannot be determined in a reasonable number of sectors the system re-starts the DC-erase field search (steps 130–133).

The DC-erase field, preamble and synchronization character searches are all performed by the controller 22 (FIG. 4). The controller 22 receives from the data separator 14 samples of the signal read from the disk. The controller 22 examines these samples as a bit-stream and determines if any segment of the signal match the signal pattern for which the controller is then looking. For example, if the controller is conducting the DC-erase field search it will examine the signal segments for a segment without transitions.

The system controller 22 can vary the number of bit-matches required to detect a synchronization character and/or the number of symbol-matches required to signify a valid address, thus allowing for more or less severe checking. For example, during the factory checking of a drive the controller 22 may require perfect matching, while much less than perfect matching may be required during system error recovery procedures.

Figure 3B:
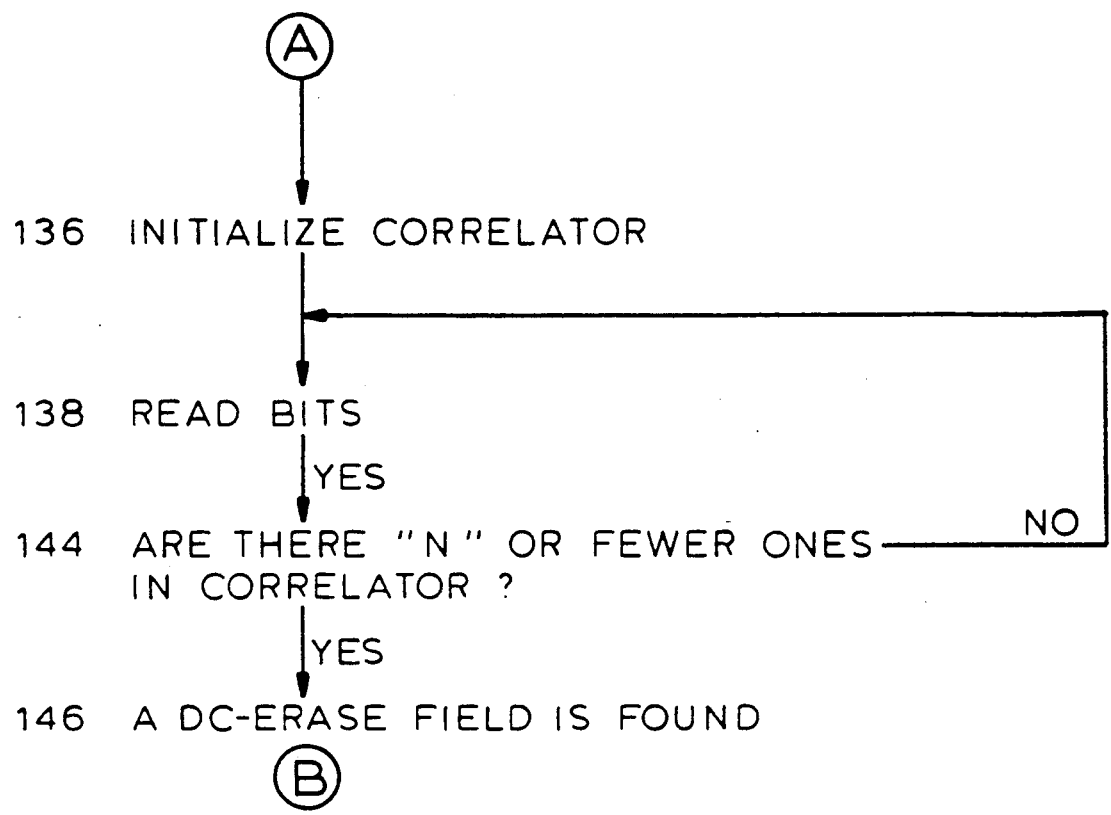
FIG. 3B is a more detailed flow chart of the steps used in looking for the DC-erase field.

With reference to FIG. 3B, the DC-erase field search is begun by loading all ONES into a correlator, or shift register, 23 in the controller 22 (FIG. 4). Thereafter signal samples from the data separator 14 are shifted into the correlator 23 and the ONES are correspondingly shifted out. Each time a sample is shifted into the correlator 23 the contents are examined to determine if the signal segment represented by the samples contains fewer than some predetermined number of ONES, indicating, with some allowance for error, a transitionless signal segment (step 144). For example, if a forty-bit signal segment is examined, a DC-erase field may be indicated if four or fewer ONES are contained in the correlator 23.

Figure 3C:
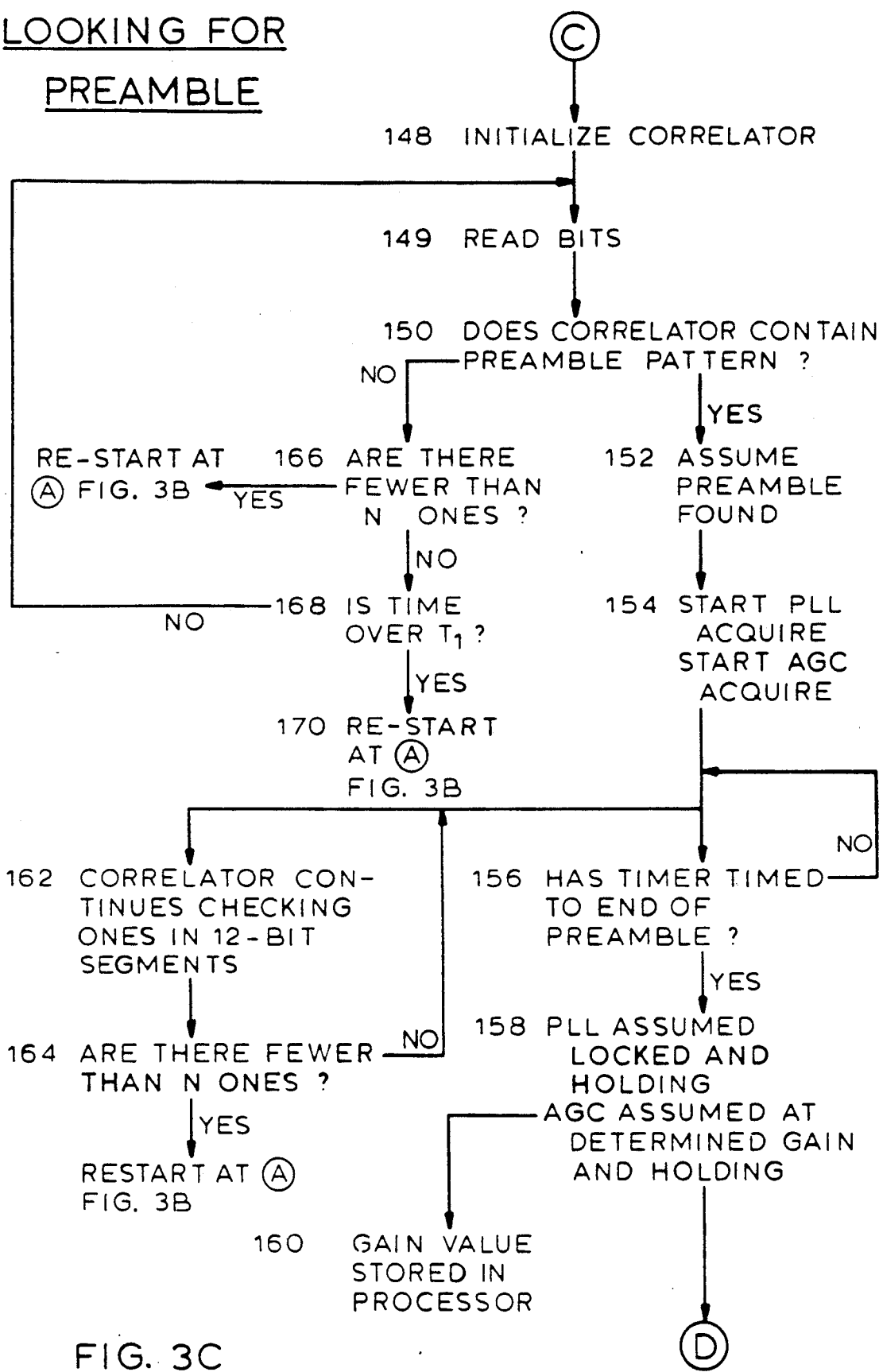
FIG. 3C is another detailed flow chart, showing the steps used in looking for the preamble.

After detecting a DC-erase field, the controller 22 starts the preamble search (step 108 FIG. 3A). With reference to FIG. 3C, the controller starts the timer 22A, and initializes the correlator 23 to all ZEROS (step 148). Signal samples are then shifted into the correlator from the data separator 14 and the contents of the correlator are repeatedly compared with the preamble pattern, that is, with a "pattern" of a minimum number of ONES in predetermined number of bits, where ONES represent transitions, although not necessarily in bit alignment (step 150). The preferred embodiment looks for four ONES in a twelve-bit signal segment. If a signal segment has a sufficient number of ONES, allowing for some error, the preamble is presumed to have been detected (step 150-152). If, however, the timer 22A reaches time $T_1$ before a preamble is detected, the synchronization process is re-started with the DC-erase field search (step 170).

While the controller searches for the preamble pattern it also checks the signal segment to determine if it contains another DC-erase field by tracking the number of ONES in the segment (step 150). Another DC-erase field is deemed to have been detected if the segment contains fewer than a predetermined number of ONES, where the predetermined number may or may not be the same as that used in the DC-erase field search (step 166). In the preferred embodiment a stricter test is used. For example, if fewer than four ONES are found in any twelve-sample signal segment a DC-erase field is presumed detected and the synchronization process is re-started.

Once the preamble is detected (step 152), acquire modes of the AGC 20 and the FLL 16 are enabled. This allows the AGC 20 to determine the appropriate read channel gain for the header section, by feeding back the signal magnitude to set the gain to a constant value, and the PLL 16 to lock to the header bit-frequency and phase. The time to the end of the preamble is sufficient for the AGC 20 and PLL 16, respectively, to lock the appropriate gain and phase (step 154). Thereafter the gain of AGC 20 is held for the remainder of the header and the PLL 16 tracks the frequency and phase of the header data-bits until the end of the address field 36. At this point the AGC gain may be stored for future use by the microprocessor 24. At the end of the field, PLL 16 is locked to the phase of the reference clock 18 (FIG. 1) because the servo field 38, which follows, does not contain information recorded with the same frequency and phase as the data-bits. Timing diagrams for the AGC 20 and the PLL 16 are shown in FIG. 2.

The operation of the AGC 20 is described in more detail in a co-pending application entitled Automatic Gain Control System, filed Sept. 4, 1987 and identified by Cesari and McKenna file number 83-476. That application, which has a common assignee with this application is incorporated herein by reference. The operation of the PLL 16 is described in more detail in co-pending application entitled Data Decoding Circuit including Phase-Locked Loop Timing, filed Oct. 30, 1987 and identified by Cesari and McKenna file number 83-461. These applications, which also have a common assignee with this application, are also incorporated herein by reference.

At the time indicating the end of the preamble, the synchronization character search is started (step 116, FIG. 3A). With reference to FIG. 3D, this search is begun by initializing the correlator 23 (FIG. 4) with the synchronization character and shifting signal samples from the data separator 14 into the correlator 23 (step 172). The signal segments are then examined for a match with the synchronization character pattern. If the pattern is found before time $T_1$ (FIG. 2), a synchronization character is deemed detected (steps 174, 176). At the end of the synchronization character the timer 22A is re-started to time to the remaining header fields and to the header section of the next sector (step 178). The timing diagram for the timer is shown in FIG. 2. If, however, the synchronization character is not detected before time $T_1$, the synchronization process is re-started with a DC-erase field search (step 175).

If the approximate AGC 20 gain setting for the data track to which the head is being synchronized is not known at the start of the synchronization process, a gain value is first determined which allows the gain to be pre-set and the DC-erase field to be detected and the same steps are followed thereafter to complete synchronization (step 100, FIG. 3A).

With reference to FIG. 3E, the gain of the AGC 20 is first set to a maximum value (step 182). The timer 22A (FIG. 1) is then started and a search is made for the DC-erase field (step 184). The search uses the same steps as the DC-erase field search described above. If a start of sector DC-erase field is not found before time $T_4$, the gain of the AGC 20 is pre-set to another value, the timer 22A is restarted and a search for the DC-erase field is again started (steps 194–198).

It is unlikely that the DC-erase field will be found when the gain of the AGC 20 is set at the maximum value because noise signals associated with the field will be amplified to look like data transitions and thus a transitionless signal will not be found. This searching and gain adjusting process continues until either the DC-erase field is found or system recovery procedures are implemented, for example, if after a predetermined number of tries no DC-erase fields can be found on the track (steps 198–204).

At the end of a successful synchronization process the gain of AGC 20 is stored in an appropriate memory (not shown) so that it may be used the next time the head is switched to that track. Pre-setting the gain of the AGC 20 allows the system to simultaneously enable the acquire modes of the AGC 20 and the PLL 16 without having the PLL 16 try to lock to the phase of amplified noise signals, for example, if the gain of the AGC 20 was too high. By pre-setting the AGC gain to the appropriate value, the normal AGC action does not have to correct very far, and it can thus acquire the appropriate gain within a relatively short time. This allows the PLL 16 to operate on almost all of the preamble 32 to acquire phase-lock and the preamble can therefore be relatively short in length.

Figure 5:
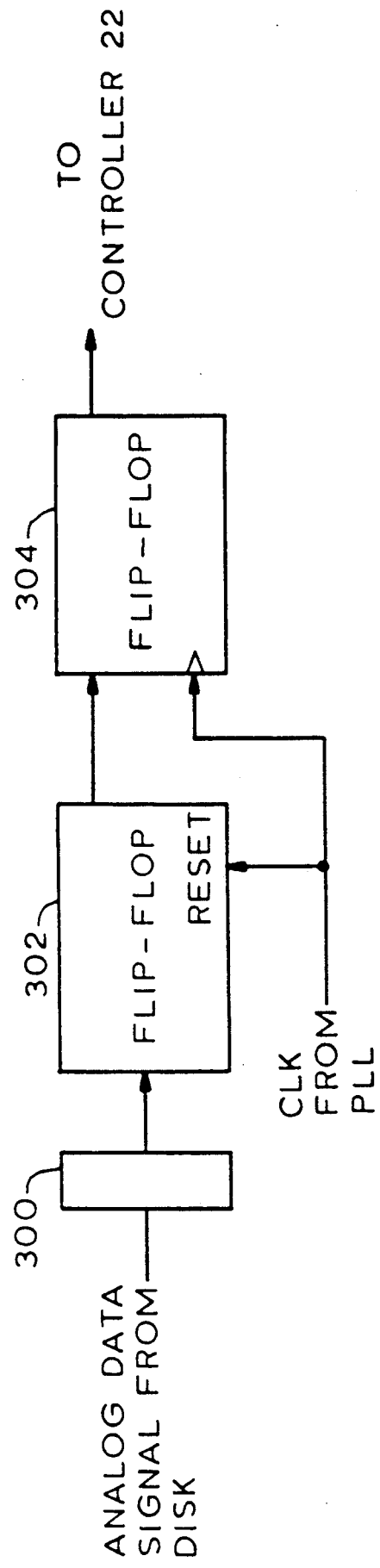
FIG. 5 is a functional block diagram of a data separator shown in FIG. 1.

During the DC-erase field search and portions of the preamble search the system has no knowledge of the bit frequency of the sector header information. Thus the data separator 14 and the PLL 16 may have to sample the signal read from the disk even if the frequency and phase to which the PLL 16 is locked is not the data-bit frequency and phase. With reference to FIG. 5, the data separator 14 includes a comparator 300 and flip-flops 302 and 304. The flip-flops 302,304 are clocked by the PLL 16 which is locked to the reference clock 18 (FIG. 1). The signal read from the disk is input to the comparator 300. The comparator output is asserted when the signal peak is within a predetermined range, indicating a flux reversal on the disk, which is interpreted as a ONE. The asserted output of the comparator is then input to flip-flop 302 and appears at its output.

The output of flip-flop 302 is input to flip-flop 304 when it is clocked by the PLL 16. Flip-flop 302 is then cleared. When flip-flop 304 is next clocked, the contents of the flip-flop are stored in the correlator 23 as a ONE (FIG. 4). If the signal peaks do not come within the predetermined amplitude range, the output of flip-flop 302 remains de-asserted and ZEROS are input to the correlator 23.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A magnetic disk for recording signals representing binary data for storage and retrieval of information in conjunction with a read write head, said disk comprising:
    A. a plurality of concentric tracks, each of said tracks comprising a plurality of sectors,
    B. each of said sectors comprising a header section and a data section, said header section having a leading end and a trailing end, said data section having a leading end and a trailing end, said trailing end of said header section being adjacent to said leading end of said data section,
    C. said header section having a plurality of magnetically recorded fields including:
        1) a DC-erase field disposed adjacent to said leading end of said header section and comprising a transitionless signal segment,
        2) a preamble field having recorded therein a series of signals suitable for synchronization of a clock to bits recorded in said header section,
        3) a synchronization field containing a synchronization character for synchronizing reading operations with group and byte boundaries, and
        4) an address field containing the address of said sector.

2. The magnetic disk defined in claim 1 in which each of said sectors includes in its header section a servo field following said address field, said servo field containing a recorded signal for use in a servo system that maintains the position of said read write head over said track.

3. The magnetic disk defined in claim 1 in which the DC-erase fields and information recorded in said preamble fields and said synchronization fields of the respective tracks is radially aligned so that the sensing of said DC-erase fields and said information is independent of the radial position of said read write head.

4. The magnetic disk defined in claim 1 in which said addresses are recorded in grey-coded binary form, with corresponding bit positions in the respective address fields being in radial alignment.

5. The magnetic disk defined in claim 2
    A) in which said addresses are recorded in grey-coded binary form, with corresponding bit positions in the respective address fields being in radial alignment; and
    B) in which the signal in each of said servo fields comprises first and second high frequency bursts positioned on opposite sides of the center line of the track and spaced apart in the circumferential direction, the relative circumferential positions of the first and second bursts being reversed from each track to the tracks adjacent thereto.

6. A magnetic disk system comprising:

A) a plurality of magnetic disks, on a common spindle, for recording signals representing binary data, each of said disks comprising:
  1) a plurality of concentric tracks, each of said tracks comprising a plurality of sectors,
  2) each of said sectors comprising a header section and a data section, said header section having a leading end and a trailing end, said data section having a leading end a trailing end, said trailing end of said header section being adjacent to the leading end of said data section,
  3) said header section having a plurality of magnetically recorded fields including, in order,
     a) a DC-erase field disposed adjacent to said leading end of said header section and comprising a transitionless signal segment,
     b) a preamble field having recorded therein a series of signals suitable for synchronization of a clock to bits recorded in said header section,
     c) a synchronization field containing a synchronization character suitable for synchronizing reading operations with group and byte boundaries of information recorded in said header section, and
     d) an address field containing the address of said sector;
B) a read write head for sensing flux transitions on said disk;
C) a DC-erase detector for detecting said DC-erase field from the output of said read write head;
D) means responsive to the detection of said DC-erase field for detecting said preamble in the output of said read write head;
E) means responsive to the detection of said DC-erase field and said preamble for detecting said synchronization character
F) a clock for providing timing signals corresponding to the retrieval of bits groups and bytes from said disk;
G) synchronizing means
  1) responsive to said preamble for synchronizing said clock to the bits recorded on said disk, and
  2) responsive to said synchronization character for synchronizing said clock to group and byte boundaries of information recorded on said disk.

7. The system defined in claim 6 in which said clock provides timing signals for timing sector fields successive to said synchronization field and including means for synchronizing said timing signals to the detection of said synchronization character.

8. The magnetic disk defined in claim 1 in which each of said sectors includes in its data section a sector map section, said sector map section containing information concerning which sectors in the track are defective.

9. The magnetic disk defined in claim 8 in which said sector map contains information concerning a number of sectors in the track.

10. The magnetic disk defined in claim 8 in which said tracks contain multiple copies of said sector map.

11. The magnetic disk defined in claim 9 in which said tracks contain multiple copies of said sector map.

12. The system defined in claim 7 in which said clock further provides timing signals for timing the detection of said preamble, and if said preamble is not detected within a predetermined time said preamble detecting means is responsive to the detection of a next DC-erase field.

13. The system defined in claim 12 in which said clock additionally provides timing signals for timing the detection of said synchronization character, and if said synchronization character is not detected within a predetermined time said synchronization character detecting means is responsive to the detection of a next DC-erase field and a next preamble.

14. The system defined in claim 12 wherein said preamble detecting means is further responsive to the detection of more than one DC-erase field within said preamble and successive sections of said header section.

15. The magnetic disk system of claim 6 wherein said DC-erase detector detects said DC-erase field by detecting a number of flux transitions below a predetermined threshold.

16. The magnetic disk system of claim 15 wherein said threshold is selected from a number of predetermined thresholds such that the threshold can be raised if no DC-erase fields are detected within a predetermined period of time or lowered if more than a predetermined number of DC-erase fields are detected within a predetermined period of time.

17. The magnetic disk system of claim 6 wherein said synchronization field detection means detects said synchronization field by detecting a series of flux transitions corresponding to a synchronization character to within a predetermined threshold number of transitions.

18. The magnetic disk system of claim 17 wherein said threshold is selected from a number of predetermined thresholds such that the threshold can be raised if no synchronization fields are detected within a predetermined period of time or lowered if more than a predetermined number of synchronization fields are detected within a predetermined period of time.

19. The magnetic disk system of claim 6 in which said header section further includes a servo field following said address field, said servo field containing a recorded signal for use in a servo system that maintains the position of said read write head over said track.

20. The magnetic disk system of claim 19 further comprising a phase-locked loop which acquires the phase and frequency of the flux transitions during said preamble field, said phase-locked loop switching to the phase of a reference clock during said servo field wherein said clock is synchronized to the reference clock until the end of said header section.

21. A magnetic disk for recording signals representing binary data for storage and retrieval of information in conjunction with a read/write head, said disk comprising:
  A. a plurality of concentric tracks, each of said tracks comprising a plurality of sectors;
  B. each of said sectors comprising a header section and a data section, said header section having a leading end and a trailing end, said data section having a leading end and a trailing end, said trailing end of said header section being adjacent to said leading end of said data section;
  C. said data section having a plurality of magnetically recorded fields including:
     1. a preamble field having recorded therein a series of signals suitable for synchronization of a clock to bits recorded in said data section,
     2. a synchronization field containing a synchronization character for synchronizing reading operations to data group and byte boundaries, and
     3. in at least one of said data sections in each of said tracks, a bad sector map, said bad sector map containing information concerning which of a predetermined number of sectors in the track are defective.

22. The magnetic disk defined in claim 21 in which each of said tracks contains multiple copies of said bad sector map.

23. The magnetic disk defined in claim 21 in which said bad sector map is updated when a previously nondefective sector which is within said predetermined number becomes defective.

24. A magnetic disk for recording signals representing binary data for storage and retrieval of information in conjunction with a read/write head, said disk comprising:
 A. a plurality of concentric tracks, each of said tracks comprising a plurality of sectors;
 B. each of said sectors comprising a header section and a data section, said header section having a leading end and a trailing end, said data section having a leading end and a trailing end, said trailing end of said header section being adjacent to said leading end of said data section;
 C. said header section having a plurality of magnetically recorded fields including
  1. a preamble field having recorded therein a series of signals suitable for synchronization of a clock to bits recorded in said header section,
  2. a synchronization field containing a synchronization character for synchronizing reading operations with group and byte boundaries of the recorded information,
  3. an address field containing the address of a sector, and
  4. a servo field containing a recorded signal for use in a servo system that maintains the position of said read/write head over said track.

25. The magnetic disk defined in claim 24 in which the information recorded in said preamble and synchronization fields of the respective track is radially aligned so that the sensing of said information is independent of the radial position of said read/write head.

26. A magnetic disk system comprising:
 A. a plurality of magnetic disks, on a common spindle, for recording signals representing binary data, each of said disks comprising:
  1. a plurality of concentric tracks, each of said tracks comprising a plurality of sectors,
  2. each of said sectors comprising a header section and a data section, said header section having a leading end and a trailing end, said data section having a leading end and trailing end, said trailing end of said header section being adjacent to the leading end of said data section,
  3. said header section having a plurality of magnetically recorded fields including, in order,
   i. a preamble field having recorded therein a series of signals suitable for synchronization of a clock to bits recorded in said header section,
   ii. a synchronization field containing a synchronization character suitable for synchronizing reading operations with group and byte boundaries of information recorded in said header section,
   iii. an address field containing the address of said sector, and
   iv. servo information suitable for centering a read/write head on a center line of said track;
 B. a read/write head for sensing flux transitions on the disk;
 C. a clock for providing timing signals corresponding to the retrieval of bits, groups and bytes from said disk;
 D. synchronization means
  1. responsive to said preamble for synchronizing said clock to the bits recorded on said disk, and
  2. responsive to said synchronization field for synchronizing said clock to group and byte boundaries of information recorded in said sector; and
 E. a servo system responsive to said synchronizing means for interpreting said servo information in said servo field and centering said head/write heads on a track.

27. A system defined in claim 26 in which
 A. said header section includes a DC-erase field adjacent to said leading end of said header section and before said preamble field, said DC-erase field comprising a transitionless signal segment; and
 B. said system further includes:
  i. a DC-erase detector for detecting said DC-erase field from the output of said read/write head,
  ii. means responsive to the detection of said DC-erase field for detecting said preamble in the output of said read/write head, and
  iii. means responsive to the detection of said DC-erase field and said preamble for detecting said synchronization character.

28. The system defined in claim 27 in which said clock provides timing signals for timing sector fields successive to said synchronization field and including means for synchronizing said timing signals to the detection of said synchronization character.

29. The system defined in claim 28 in which said clock further provides timing signals for timing the detection of said preamble, and if said preamble is not detected within a predetermined time said preamble detecting means is responsive to the detection of a next DC-erase field.

30. The system defined in claim 29 in which said clock additionally provides timing signals for timing the detection of said synchronization character, and if said synchronization character is not detected within a predetermined time said synchronization character detecting means is responsive to the detection of a next DC-erase field and a next preamble.

31. The system defined in claim 29 wherein said preamble detecting means is further responsive to the detection of more than one DC-erase field within said preamble and successive sections of said header section.

* * * * *